United States Patent
Gupta et al.

(10) Patent No.: US 11,538,376 B2
(45) Date of Patent: Dec. 27, 2022

(54) METHOD AND A FLEXIBLE APPARATUS MANAGING A FOLDING THEREOF

(71) Applicant: Samsung Electronics Co., Ltd., Suwon-si (KR)

(72) Inventors: Gaurav Gupta, Bangalore (IN); Arindam Mondal, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 17/168,070

(22) Filed: Feb. 4, 2021

(65) Prior Publication Data
US 2021/0241666 A1 Aug. 5, 2021

(30) Foreign Application Priority Data

Feb. 4, 2020 (IN) .............................. 202041004833

(51) Int. Cl.
*G09G 3/00* (2006.01)
*G06F 1/16* (2006.01)

(52) U.S. Cl.
CPC ........... *G09G 3/035* (2020.08); *G06F 1/1652* (2013.01)

(58) Field of Classification Search
CPC .............................. G09G 3/035; G06F 1/1652
USPC ................... 345/173, 501, 619, 156
See application file for complete search history.

(56) References Cited

U.S. PATENT DOCUMENTS

| | | | |
|---|---|---|---|
| 3,547,197 A1 | 10/2013 | Byun et al. | |
| 9,268,368 B2 | 2/2016 | Kang et al. | |
| 9,569,018 B2 | 2/2017 | Kang et al. | |
| 9,886,187 B2 | 2/2018 | Seo et al. | |
| 2011/0057873 A1* | 3/2011 | Geissler | G06F 1/1626 345/156 |
| 2013/0234734 A1 | 9/2013 | Iida et al. | |
| 2014/0292717 A1 | 10/2014 | Kang et al. | |
| 2015/0331496 A1* | 11/2015 | Kwak | G06F 3/017 345/156 |

(Continued)

FOREIGN PATENT DOCUMENTS

| | | |
|---|---|---|
| KR | 10-2009-0087303 A | 8/2009 |
| KR | 10-2013-0113900 A | 10/2013 |

(Continued)

OTHER PUBLICATIONS

Cho Shi-Yun Lee (AU 213297228 B2) Flexible Device for Providing Bending Interaction Guide and Control Method Thereof published on Apr. 21, 2016 Samsung Electronics co. Ltd.paragraphs 82-110, 119-121, 127, 129 Figures 5,6.*

(Continued)

*Primary Examiner* — Prabodh M Dharia

(57) ABSTRACT

An apparatus can manage a folding performed on a flexible device. The apparatus includes a foldable display, at least one sensor coupled to the foldable display, and a processor. The at least one sensor includes at least two sensing elements each of the at least two sensing elements is arranged asymmetrically with respect to each other along the foldable display. The processor is configured to determine at least one of a location and an angle of folding of the foldable display based on sensed values detected from the at least two sensing elements. The processor is also configured to render content on the foldable display based on the location and the angle of the folding.

16 Claims, 18 Drawing Sheets

(56) References Cited

U.S. PATENT DOCUMENTS

| | | | |
|---|---|---|---|
| 2017/0068370 A1* | 3/2017 | Hong .................... | G06F 1/1643 |
| 2018/0033398 A1* | 2/2018 | Okamoto ............. | G09G 3/3233 |
| 2018/0039339 A1* | 2/2018 | Henell .................. | G06F 1/1615 |
| 2018/0359350 A1* | 12/2018 | Kim .................. | H04M 1/72403 |
| 2019/0101997 A1 | 4/2019 | Kim et al. | |
| 2020/0004297 A1* | 1/2020 | Rekapalli ................ | G06F 3/147 |
| 2020/0125144 A1* | 4/2020 | Chung .................. | G06F 3/0414 |
| 2020/0333835 A1* | 10/2020 | Wl ........................ | G06F 3/0484 |

FOREIGN PATENT DOCUMENTS

| | | |
|---|---|---|
| KR | 10-2016-0036154 A | 4/2016 |
| KR | 10-2017-0049777 A | 5/2017 |
| KR | 10-2018-0073730 A | 7/2018 |

OTHER PUBLICATIONS

International Search Report and Written Opinion of the International Searching Authority dated May 4, 2021 in connection with International Application No. PCT/KR2021/001486, 9 pages.

* cited by examiner

METHOD AND A FLEXIBLE APPARATUS MANAGING A FOLDING THEREOF

CROSS-REFERENCE TO RELATED APPLICATION

This application is based on and claims priority under 35 U.S.C. § 119 of an Indian patent application number 202041004833, filed on Feb. 4, 2020, in the Indian Patent Office, the disclosure of which is incorporated by reference herein in its entirety.

BACKGROUND

1. Field

The present disclosure relates to managing a flexible electronic devices which is foldable in multiple locations. More particularly, the disclosure relates to detecting at least one location of folding or bending and detecting a corresponding angle of the folding or the bending on the flexible electronic device.

2. Description of Related Art

A flexible electronic device can be folded or bent so that its configuration, size and length are changed by external forces while displaying content. The content can be displayed in various configurations by detecting locations of folds bends and a corresponding angle of the fold. The flexible electronic device may use sensors to detect the locations of the fold and the corresponding angle of the fold.

In general, a folding location in the flexible device may be pre-determined by a manufacturer of the flexible device. However, with the advancement of technology, the flexible device provides multiple folding locations which are not predetermined by the manufacturer but a user may fold the flexible device at a random location and in a random direction of the flexible device. In such cases, a location and an angle of the folding should be known to the flexible device.

SUMMARY

Example embodiments address at least the above problems and/or disadvantages and other disadvantages not described above. Also, the example embodiments are not required to overcome the disadvantages described above, and may not overcome any of the problems described above.

In accordance with an aspect of the disclosure, provided is a flexible device including a display, a sensor, and a processor coupled to the sensor and the display. The sensor is configured to sense at least one location of a folding of the display on the electronic device and a corresponding angle of the folding, where the sensor includes at least one bend sensor and the at least one bend sensor includes at least two sensing elements in an asymmetric configuration. The processor is configured to control the display to display at least one content to a user based on the sensed at least one location of the folding and the corresponding angle of the folding.

In accordance with another aspect of the disclosure, a method for managing a folding performed on a flexible device is provided. The method disclosed herein includes sensing, by a sensor, at least one location of a fold of the display on the electronic device and a corresponding angle of the fold, where the sensor includes at least one bend sensor and the at least one bend sensor includes at least two sensing elements in an asymmetric configuration. The method further includes managing the display to display at least one content to a user based on the sensed at least one location of the folding and the corresponding angle of the folding.

In accordance with another aspect of the disclosure, a flexible apparatus is provided. The apparatus includes a foldable display, at least one sensor coupled to the foldable display comprising at least two sensing elements each of which is arranged asymmetrically each other along the foldable display, a processor configured to determine at least one of a location and an angle of folding of the foldable display based on sensed values detected from the at least two sensing elements and control to render content on the foldable display based on the location and the angle of the folding.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
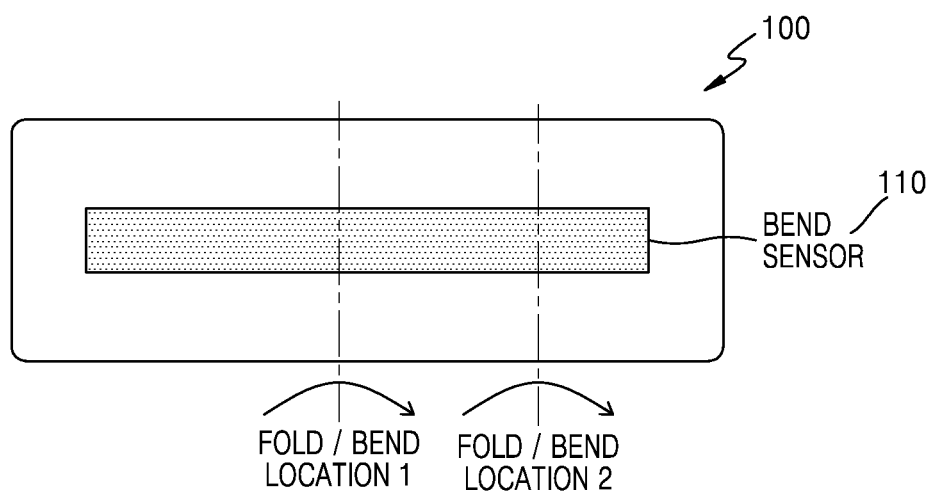
FIG. 1A, FIG. 1B, FIG. 1C and FIG. 1D illustrate a foldable device including at least one folding sensor, according to an embodiment of the disclosure.

FIGS. 1A through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the embodiments can be practiced without those specifically defined matters. Also, well-known functions or constructions are not described in detail since they would obscure the description with unnecessary detail.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "1st" or "first" and "2nd" or "second" may use corresponding components regardless of importance or order and are used to distinguish one component from another without limiting the components.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Embodiments of the present disclosure will be described below in detail with reference to the accompanying drawings.

FIG. 1A, FIG. 1B, FIG. 1C and FIG. 1D illustrate a flexible device including at least one folding sensor.

The various shape transformations derived by folding or bending a flexible electronic device hereinafter may be collectively referred to as folding. The shape transformations may be defined according to at least one of a size, a type, a weight, and characteristics of the flexible electronic device. Embodiments herein use the terms such as "flexible electronic device", "flexible display device", "foldable device", "rollable device", "bendable device", and "electronic device with flexible display" interchangeably to refer to a flexible device supporting one or more shape transformations.

Referring to FIG. 1A, the flexible electronic device 100 include at least one bend sensor 110 to detect a location of folding. The bend sensor 110 may be designed with a uniform width (symmetric in its structure). The bend sensor 110 is folded when the flexible electronic device 100 is folded and a length and/or a width of the bend sensor 110 slightly changes due to the folding. Further, the sensing value sensed by the bend sensor 110 changes due to the changes of the length and the width of the bend sensor 110.

Figure 1B:
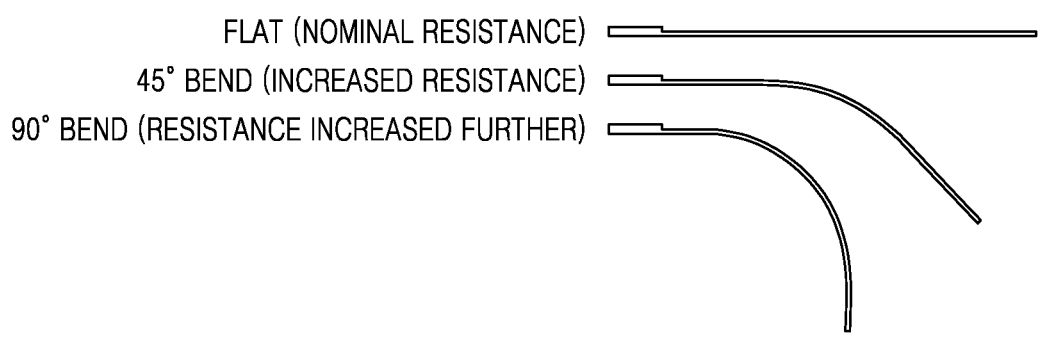
Figure 1C:
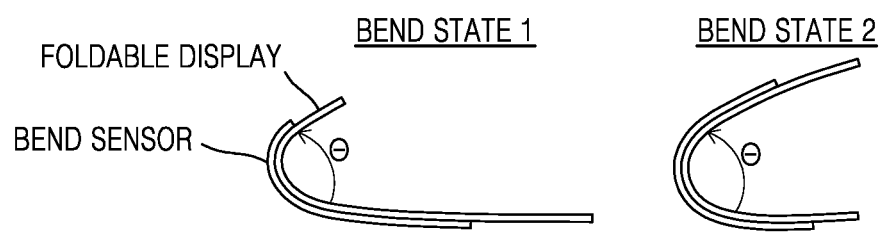
Figure 1D:
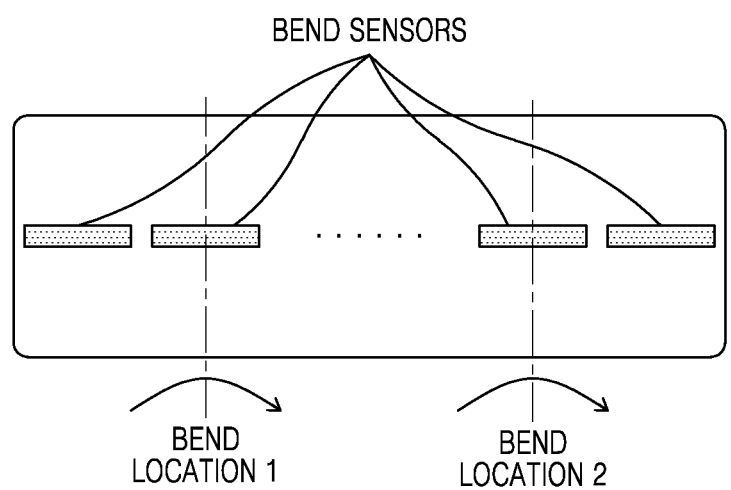

The bend sensor 110 may detect the locations of the folding of the flexible electronic device 100 by measuring the change in resistance value sensed by the bend sensor 110 as illustrated in FIG. 1B. Referring to FIG. 1B, the resistance value sensed by the bend sensor 110 may increase as the angle of the bending decreases. However, the bend sensor 110 in FIG. 1B may not be able to identify multiple locations of the folds because the bend sensor 110 senses the same resistance value change in the bend sensor irrespective of the location of the folding due to a symmetric nature of the bend sensor 110 as illustrated in FIG. 1C. As a result, the flexible device may adopt a plurality of bend sensors or an array of bend sensors to detect the multiple locations of the folding as illustrated in FIG. 1D. However, the plurality of bend sensors may cost high and may be cumbersome.

Figure 2:
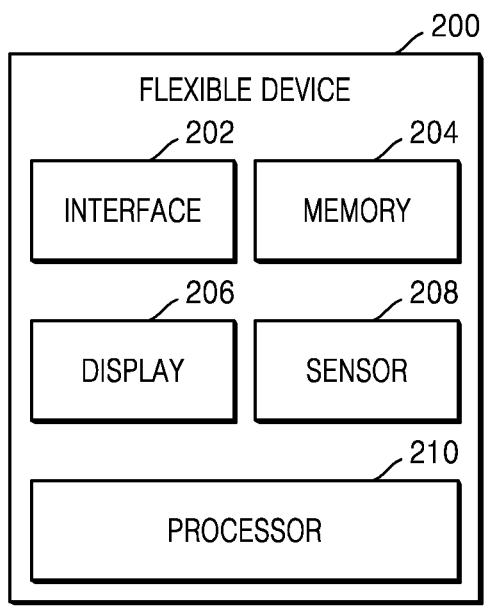
FIG. 2 illustrates a block diagram of a flexible electronic device, according to an embodiment of the disclosure.

FIG. 2 illustrates a block diagram of a flexible electronic device, according to an embodiment of the disclosure. The flexible device 200 herein can be a device supporting one or more shape transformations to display content in multiple configurations. Examples of the flexible device 200 can be, but not limited to, a mobile phone, a smartphone, a tablet, a phablet, a personal digital assistant (PDA), a laptop, an electronic reader, an IoT (Internet of Things) device, a wearable device, a medical device, a gaming device, a smart watch, a Head-Mounted Display (HMD), and so on. Examples of the content herein can be, but not limited to, a multimedia content (for example, an image, a video, an animation, and so on), a textual content, a remainder, an application content (for example, a calendar application, a weather application, a sports application, a news application and so on), an icon, a ticker, a widget, an advertisement and so on. Examples of the shape transformations can be, but not limited to, folding, bending, rolling, twisting of the flexible device 200, and so on. Thus, the terms of "folding", "bending", and "rolling" may be used interchangeably throughout the specification.

The flexible device 200 may include an interface 202, a memory 204 a display 206, a sensor 208, and a processor 210. The flexible device 200 may also include at least one sensor 208 for detecting user inputs, external changes of physical characteristics of the flexible device 200, orientation and shape of the flexible device 200, and so on. The sensor 208 may include at least one of a gyroscope, an accelerometer, a gravity sensor, a proximity sensor, an angular velocity sensor, a strain gauge sensor, a visual sensor (such as a camera, iris scanner), an audio sensor (such as a microphone), an inertial sensor, and so on. The flexible device 200 may also access data stored in a server (not shown), an external database/storage (not shown) using a communication network for managing the display 206. Examples of the communication network can be, but not limited to, the Internet, a wired network (a Local Area Network (LAN), Ethernet and so on), a wireless network (a Wi-Fi network, a cellular network, a Wi-Fi Hotspot, Bluetooth, Zigbee or the like), and so on.

The interface 202 can be configured to enable the flexible device 200 to communicate with at least one external entity such as, but not limited to, the external databases/storage, the server.

The display 206 is configured to display content to a user. In an embodiment, the display 206 may be implemented to support flexible display characteristics of the shape transformations such as bending, folding, rolling, and so on.

The display 206 may include one or more elements that can assist in achieving the folding of the display 206 such as actuators, a flexible substrate, a driver, a display panel, a protective layer, and so on. The display 206 may be implemented with at least one of a flexible or flat panel liquid crystal display (FLCD), a flexible or flat panel organic light emitting diode (flexible or flat panel OLED), and so on. The display 206 may also be implemented as an electronic paper, where general characteristics of ink may be applied to the electronic paper and the electronic paper uses reflected light to display the content. The electronic paper may change the content using electrophoresis using a twist ball or capsule.

Further, the display 206 may also include one or more display screens that can be activated according to the content and the display characteristics of the display 206 (for example, the flexible display characteristics, the flat panel display characteristics, and so on).

The sensor 208 is configured to sense at least one location of the folding and an associated angle of the fold (a folding angle) of the display 206 implemented on the flexible device 200. There can be a plurality of folding locations on the display 206 of the flexible device 200. The location of the folding may be referred to an area/region of the display 206 being folded. Embodiments herein use the terms such as "region of fold(ing)", "region of bend(ing)", "location of fold(ing)", "location of bend(ing)", "bend(ing) location", "fold(ing) location", and so on interchangeably to refer to the location of the folding on the flexible device 200. The folding angle refers to an angle corresponding to the folding of the display 206. Embodiments herein use the terms such as "bend(ing) angle", "fold(ing) angle", "angle of bend(ing)", "angle of fold(ing)", and so on interchangeably to refer to an angle corresponding to the folding angle of the display 206.

Figure 3A:
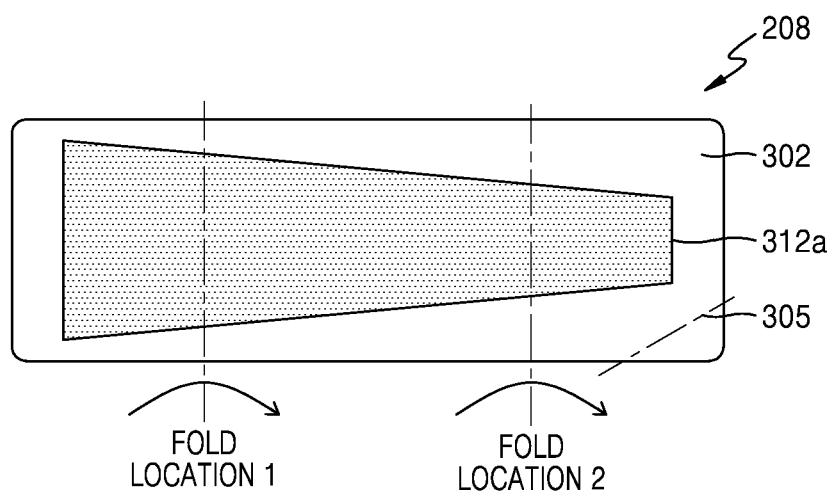
FIG. 3A illustrates an exemplary implementation of a bend sensor in the flexible device, according to an embodiment of the disclosure.

The sensor 208 may include one or more bend sensors. FIG. 3A illustrates an exemplary implementation of a bend sensor in the flexible device 200, according to an embodiment of the disclosure.

Referring to FIG. 3A, the bend sensor 302 can be implemented in various types such as, but not limited to, an optical bending sensor, a pressure sensor, or a strain gauge. The one or more bend sensors 302 may be printed or positioned on flexible components of the flexible device 200. Examples of the flexible components can be, but not limited to, the display 206, a printed circuit board (PCB), and so on. Further, the sensor 208 may include a number of bend sensors 302 according to a size, a type, and function of the flexible device 200. In an example, the sensor 208 may include a bend sensor 302 that can be printed on the flexible component of the flexible device 200.

The bend sensor 302 with the single sensing element 312 may be used to detect a location of the folding and an angle of the folding on the flexible device 200. However, the bend sensor 302 with the single sensing element 312a may not be able to detect a folding 305 occurred on the flexible component which the single sensing element may not cover.

In an example, the sensor 208 may include an array of bend sensors 302 that can be printed on the flexible component and the bend sensor 302 may be suitably arranged on the flexible component.

In an embodiment, the bend sensor 302 may include a plurality of sensing elements. In an embodiment, the sensing elements of the bend sensor 302 may be of an asymmetric configuration. In an embodiment, the sensing elements of the bend sensor 302 may be in a triangular shape with non-uniform width or in a trapezoidal shape with non-uniform width. The non-uniform width indicates that the width of the sensing elements of the bend sensor 302 may vary—e.g., increase or decrease—in horizontal and/or vertical direction of the display 206 of the flexible device 200. The sensing elements of the bend sensor 302 may be electrically and/or physically isolated from each other. In an embodiment, the sensing elements in a triangular shape may be printed on the display 206 as the flexible component by facing each other for detecting the location of the folding and the corresponding angle of the folding.

In an embodiment, the sensing elements can be of a rectangular shape and can be positioned on a top side and a bottom side of the display 206 as the flexible component for detecting a direction of the folding of the display 206.

In an embodiment, the sensing elements of the bend sensor 302 may be fabricated using sensing materials such as, but not limited to, printed ink, liquid metal, resistance-sensing material, capacitance-sensing material and so on. In an embodiment, the sensing elements of the bend sensor 302 may also be implemented as at least one of an electric resistance sensor using an electric resistance, a micro optical fiber sensor using optical fibers, and so on. Further, the sensing elements of the bend sensor 302 can be bendable and have a resistance value. The sensing elements of the bend sensor 302 may fold/stretch locally when the display 206 of the flexible device 200 folds. Stretching of the sensing elements may change the shape and dimensions of the sensing elements (such as a length and a width of the sensing elements). The change in the shape and dimensions of the sensing elements may give rise to a change of sensing value of the sensing elements. In an embodiment, the resistance value of the sensing elements of the bend sensor may vary when the sensing elements are electric resistors and there is a change in the dimensions due to the folding. In an embodiment, due to the non-uniform width of the sensing elements (the asymmetric configuration), the change in dimensions of the sensing elements may be unique at each and every folding on the flexible device 200. Thus, the resistance value of the sensing elements of the bend sensor 302 may change uniquely for different locations of the folding.

Figure 3B:
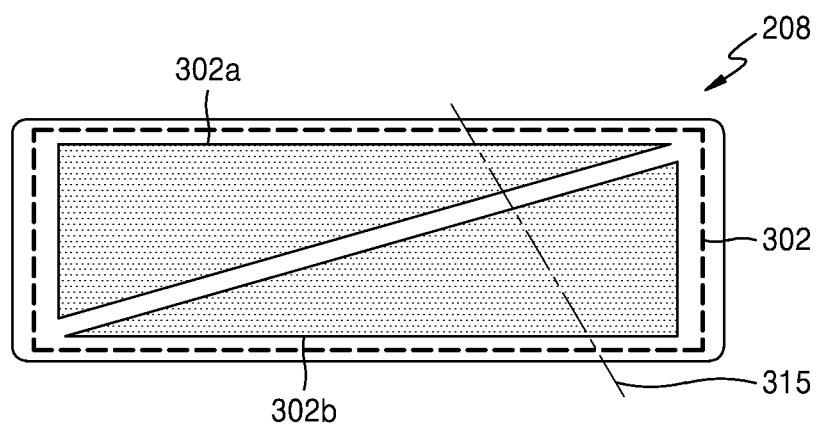
FIG. 3B illustrates an exemplary implementation of a bend sensor in the flexible device, according to an embodiment of the disclosure.

FIG. 3B illustrates an exemplary implementation of a bend sensor in the flexible device, according to an embodiment of the disclosure.

Referring to FIG. 3B, the sensor 208 is configured to detect multiple locations of the folding and the respective angle of the folding using the single bend sensor 302 with two sensing elements 302a and 302b. The two sensing elements 302a and 302b have non-uniform width and are triangular-shaped, thereby having the asymmetric configuration. The two sensing elements 302a and 302b are isolated from each other and may face opposite to each other. The two sensing elements 302a and 302b of the bend sensor 302 may be printed on the at least one flexible component of the flexible device 200. In an embodiment, the processor 210 is able to detect a location and an angle of a diagonal folding 315 performed on the display 207 because the two sensing elements 302a and 302b cover the entire area of the display 206 of the flexible device 200.

The processor 210 may obtain the change of the resistance value sensed by the sensing elements of the bend sensor(s) 302. The change of the resistance value may correspond to the location of the folding and the angle of the folding. Referring to FIG. 3B, the asymmetric sensing elements 302a and 302b of the bend sensor 302 may sense changes of the resistance value and identify multiple locations of the folding on the flexible device 200, because the changes of the resistance value are unique for each of the folding according to an embodiment. Given the asymmetric shape of the sensing elements, the combination of the resistance value changes is unique for a given location and a corresponding folding angle.

In an embodiment, the sensor 208 may also sense a direction of the fold on the flexible device 200 using the two or more sensing elements of the bend sensor 302 that are implemented on the two sides of the flexible component. The direction of the folding may be an inward folding or an outward folding. The sensor 208 measures the change of the resistance value of the sensing elements of the bend sensor to detect the direction of the fold.

Figure 3C:
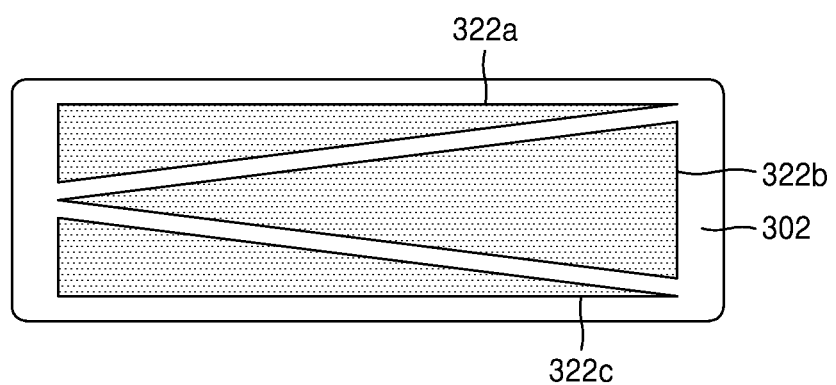
FIG. 3C illustrates an exemplary implementation of a bend sensor in the flexible device, according to an embodiment of the disclosure.

FIG. 3C illustrates an exemplary implementation of a bend sensor in the flexible device, according to an embodiment of the disclosure.

Referring to FIG. 3C, the bend sensor 302 includes three sensing elements 322a, 322b, and 322c each of which has a triangular shape.

Figure 3D:
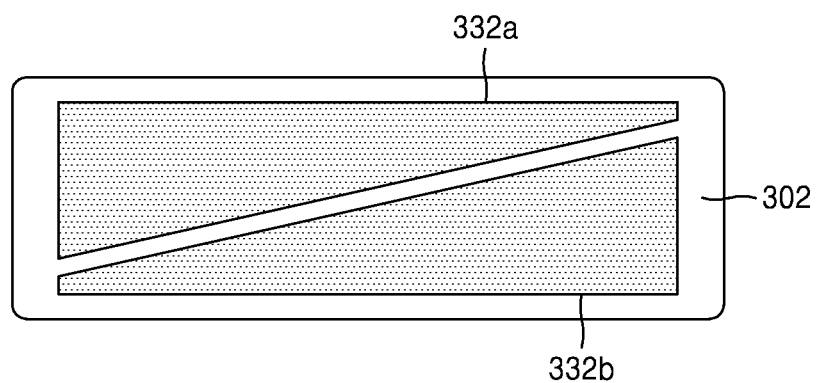
FIG. 3D illustrates an exemplary implementation of a bend sensor in the flexible device, according to an embodiment of the disclosure.

FIG. 3D illustrates an exemplary implementation of a bend sensor in the flexible device, according to an embodiment of the disclosure.

Referring to FIG. 3D, the bend sensor 302 includes two sensing elements 332a and 332b each of which has a trapezoidal shape.

Referring back to FIG. 2, the processor 210 can include at least one of a single processor, a plurality of processors, multiple homogenous cores, multiple heterogeneous cores, multiple Central Processing Unit (CPUs) of different kinds and so on. The processor 210 can be configured to manage the display 206 based on a location and/or an angle of the folding. The processor 210 obtains the measured change of the resistance value of the sensing elements of the bend sensor 302 from the sensor 208. On obtaining the measured change of the resistance value of the sensing elements, the processor 210 may fetch a location-angle mapping table by accessing at least one of the memory 204 or a server storing the location-angle mapping table. The location-angle mapping table includes information about a mapping of the location of the fold and the fold angle with respect to the resistance values. The processor 210 maps the measured change of the resistance value of the sensing elements with the location of the folding and the corresponding folding angle to determine the location of the folding and the corresponding folding angle on the flexible device 200.

The processor 210 can also be configured to manage the display 206 for displaying content to the user in various configurations. The processor 210 can manage the display 206 by performing at least one action based on the determined location of the folding and the corresponding angle of the folding. Examples of the action can be, but not limited to, modifying a User Interface (UI) on the display 206 to change an activated portion of the screen of the display 206 or a deactivated portion of the screen of the display 206 to another portion of the screen based on the detected location of the folding and, triggering an active portion of the screen of the display 206 or an inactive portion of the screen of display 206 based on the determined location of the bending and/or the folding angle, changing setting parameters such as display brightness, volume based on the angle of the folding. Exemplary actions based on the location of the folding and the corresponding angle of the folding may be illustrated in detail referring to FIGS. 7A and 7B later.

In an embodiment, the memory 204 can store data related to physical characteristics of the display 206, the content, the location-angle mapping table, and so on. Examples of the memory 204 can be, but not limited to, NAND, embedded Multi Media Card (eMMC), Secure Digital (SD) cards, Universal Serial Bus (USB), Serial Advanced Technology Attachment (SATA), solid-state drive (SSD), and so on. The memory 204 may also include one or more computer-readable storage media. The memory 204 may also include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 204 may, in some examples, be considered as a non-transitory storage medium. The term "non-transitory" may indicate that the storage medium is not embodied in a carrier wave or a propagated signal. However, the term "non-transitory" should not be interpreted to mean that the memory 204 is non-movable. In some examples, the memory 204 can be configured to store larger amounts of information than the memory. In certain examples, a non-transitory storage medium may store data that may, over time, change (e.g., in Random Access Memory (RAM) or cache).

FIG. 2 shows exemplary components of the flexible device 200, but it is to be understood that other embodiments are not limited thereto. In other embodiments, the flexible device 200 may include less or more components. One or more components can be combined together to perform the same or substantially similar function in the flexible device 200.

Referring back to FIG. 3B, each sensing element among a plurality of sensing elements 302a and 302b may have a resistance value, where the resistance value may be a function of the length and width of the sensing element. Thus, the resistance value changes in each sensing element according to the changes in the length and width of the sensing element when the display 206 and/or the flexible device 200 is folded. Further, due to the non-uniform width in at least one direction along a side of the display 206, the changes of the resistance value in each sensing element 302a/302b may be unique for each folding. Thus, the sensor 208 may identify the multiple locations of the folding by measuring the changes of the resistance value in the sensing elements 302a and 302b of the bend sensor 302. The measured changes of the resistance values in the sensing elements 302a and 302b indicate the locations of the folding and the folding angle with respect to multiple folding axes.

Figure 4A:
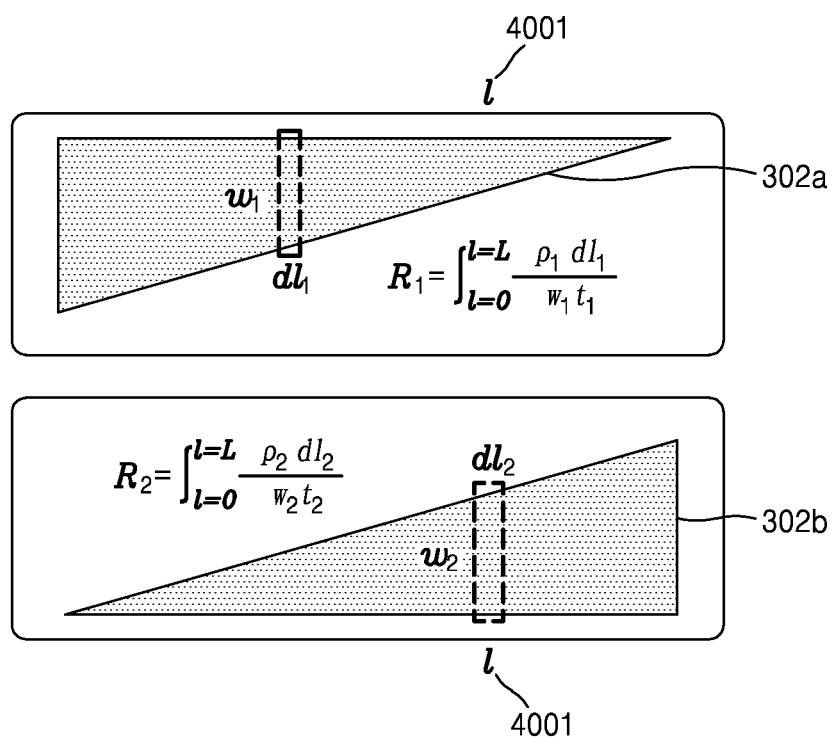
FIG. 4A illustrates a sensor including two asymmetric bend sensors for detecting multiple locations of the folding and the corresponding angle of the folding on the flexible device, according to an embodiment of the disclosure.

FIG. 4A illustrates a sensor including two asymmetric bend sensors for detecting multiple locations of the folding and the corresponding angle of the folding on the flexible device, according to an embodiment of the disclosure.

Referring to FIG. 4A, the cross-sectional resistance values of each sensing element 302a, 302b having non-uniform width and length can be computed as Equation 1 and Equation 2 below:

$$R_1 = \int_{l=0}^{l=L} \frac{\rho_1 dl_1}{w_1 t_1}, w_1 \propto l_1 \qquad \text{Equation 1}$$

$$R_2 = \int_{l=0}^{l=L} \frac{\rho_2 dl_2}{w_2 t_2}, w_2 \propto l_2 \qquad \text{Equation 2}$$

wherein, '$R_1$' can be a resistance value of the sensing element 302a, '$R_2$' can be a resistance value of the sensing element 302b. '$\rho_1$' and '$\rho_2$' are resistivity of materials (sensor material) of the sensing elements 302a and 302b, respectively. '$dl_1$' and '$dl_2$' are differential length of the sensing elements 302a and 302b, respectively. '$w_1$' and '$w_2$' can be the width of the sensing elements 302a and 302b respectively. '$t_1$' and '$t_2$' are a thickness of the material of the sensing elements 302a and 302b, respectively.

Figure 4B:
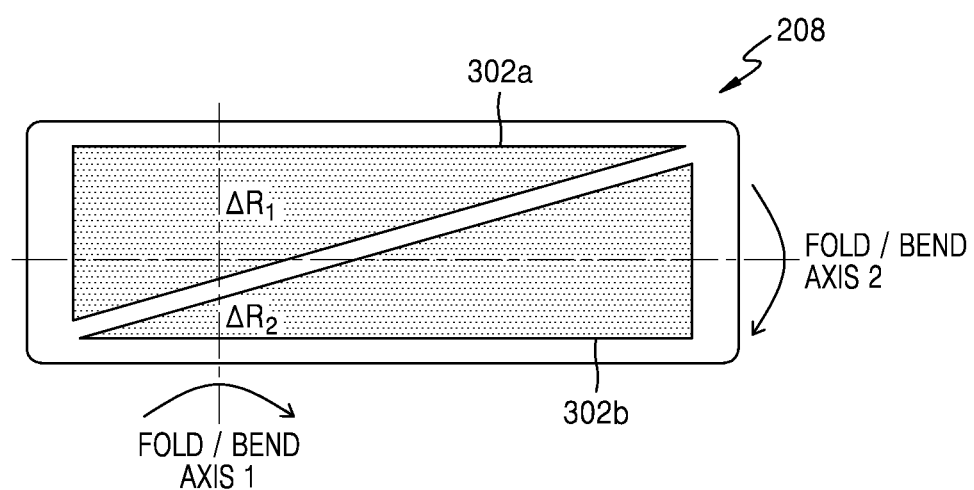
FIG. 4B illustrates a sensor including two asymmetric bend sensors for detecting multiple locations of the folding on the flexible device, according to an embodiment of the disclosure.

FIG. 4B illustrates a sensor including two asymmetric bend sensors for detecting multiple locations of the folding on the flexible device, according to an embodiment of the disclosure.

Referring to FIG. 4B, when the display 206 or the flexible device 200 is folded at a bend/fold axis 1, the sensing elements 302a and 302b may be folded accordingly. The length and the width of the sensing elements 302a and 302b may change as a function of the bend angle. When the display 206 or the flexible device 200 is folded at a bend/fold axis 2, the sensing element 302a and 302b may be folded accordingly. Thus, the length and the width of the sensing elements 302a and 302b may change.

The new length and width of the sensing elements 302a and 302b in accordance with the folding can be computed using an infinitesimal length dl as Equation 3 and Equation 4 below:

$$dl \rightarrow dl^l \qquad \text{Equation 3}$$

$$W \rightarrow w^l = w\left(1 - \gamma\left(1 - \frac{dl^l}{dl}\right)\right) \qquad \text{Equation 4}$$

where, '$w^l$' is the width corresponding to the position 'l' of the sensing element 302a, the change in length of the complete sensing element 302a would be determined by integrating '$dl^l$' along the length of the sensing element 302a. As the length and width of the sensing elements 302a and 302b change, the changes of the resistance value of the sensing elements 302a and 302b are computed as Equation 5 and Equation 6 below:

$$R_1 = \int_{l=0}^{l=L} \frac{\rho_1 dl^l_1}{w^l_1 t_1} \qquad \text{Equation 5}$$

$$R_2 = \int_{l=0}^{l=L} \frac{\rho_2 dl^l_2}{w^l_2 t_2} \qquad \text{Equation 6}$$

where '$w'_1$' is the changed width at length '$l'_1$' of the sensing element 302a, and $w'_2$' is the changed width at length '$l'_2$' for the sensing element 302b. Thus, the two sensing elements 302a and 302b operate in tandem to detect the bending or folding about any axis on the display 206.

Figure 4C:
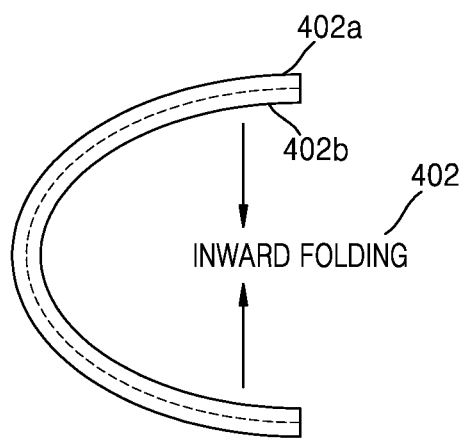
FIG. 4C illustrates a detection of a direction of the folding in the flexible device, according to an embodiment.

FIG. 4C illustrates a detection of a direction of the folding in the flexible device, according to an embodiment.

Referring to FIG. 4C, each of two sensing elements are implemented on a top of the flexible component and a bottom of the flexible component, respectively. The resistance value of the sensing element 402a printed on the top of the flexible component increases because of tension brought by the folding and the resistance value of the sensing element 402b printed on the bottom of the flexible component decreases because of compression brought by the folding. The processor 210 obtains the increased resistance value sensed by the sensing element 402a printed on the top and the decreased resistance value sensed by the sensing element 402b printed on the bottom and accordingly, the processor 210 determines that the direction of the bending/folding is inward 402 (the inward folding).

In an example, consider that the resistance value of the sensing element printed on the top of the flexible component decrease due to a compression brought by the folding and the resistance value of the sensing element printed on the bottom of the flexible component increases due to tension brought by the folding. The sensor 208 measures the decreased resistance value of the sensing element printed on the top and the increased resistance of the sensing element printed on the bottom and accordingly, the processor 210 determines that the direction of the bending/folding is outward (the outward folding).

Figure 5:
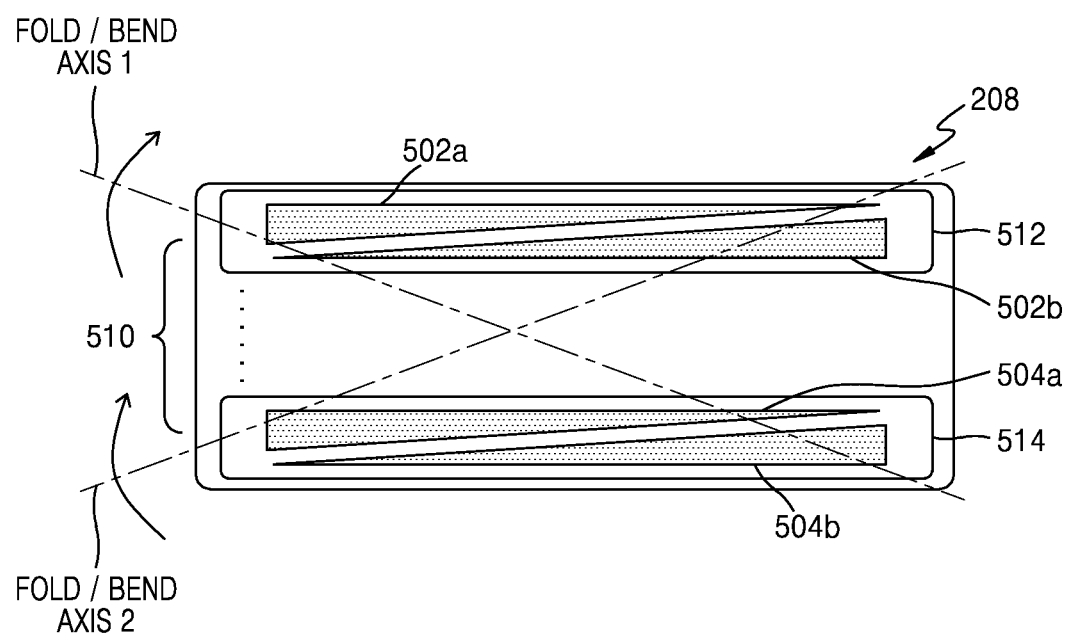
FIG. 5 illustrates a sensor including an array of bend sensors for detecting multiple locations of the folding and the corresponding angle of the folding on the flexible device, according to an embodiment of the disclosure.

FIG. 5 illustrates a sensor including an array of bend sensors for detecting multiple locations of the folding and the corresponding angle of the folding on the flexible device, according to an embodiment of the disclosure. Referring to FIG. 5, the sensor 208 includes the array of bend sensors 510, wherein the bend sensors 510 can be positioned one after another. Each bend sensor 512, 514 includes the two sensing elements 502*a*, 502*b*, 504*a* and 504*b* with the non-uniform width and of triangular shape. Further, the two sensing elements 502*a*, 502*b*, 504*a* and 504*b* of the bend sensor 512 and 514 are structurally asymmetric and facing opposite to each other. In an embodiment, the shape of the two sensing elements may be trapezoidal.

The sensor 208 senses the change of resistance values of the sensing elements and detects a folding of the flexible device 200 about multiple axes.

Figure 6:
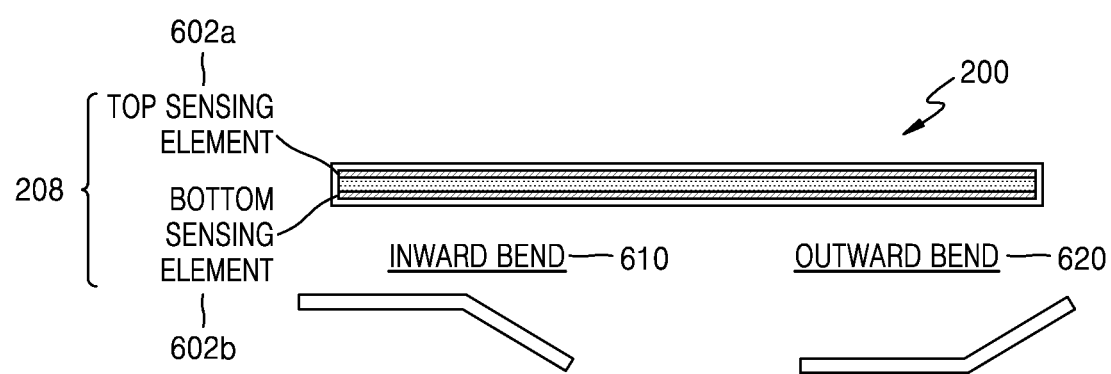
FIG. 6 illustrates the sensor including a top sensing element and a bottom sensing element on the flexible device, according to an embodiment of the disclosure.

FIG. 6 illustrates the sensor 208 including a top sensing element and a bottom sensing element on the flexible device 200, according to an embodiment of the disclosure.

Referring to FIG. 6, the sensor 208 includes two sensing elements which are a top sensing element 602*a* and a bottom sensing element 602*b* printed on the flexible component of the flexible device 200, respectively. In an embodiment, the two sensing elements can be printed on the top side and the bottom side of the flexible component. For example, the top sensing element 602*a* is printed on the top side of the flexible component and the bottom sensing element 602*b* can be printed on the bottom of the flexible component.

In an example scenario, when the flexible device 200 is folded by a user, it is found that the resistance value of the top sensing element 602*a* printed on the top of the flexible component increases due to a tension by the folding and the resistance value of the bottom sensing element 602*b* printed on the bottom of the flexible component decreases due to a compression by the folding. The sensor 208 senses the increased resistance value of the top sensing element 602*a* and the decreased resistance value of the bottom sensing element 602*b*, and the processor 210 determines an occurrence of an inward folding 610 in the flexible device 200.

In another example scenario, when the flexible device 200 is folded by a user, it is found that the resistance value of the top sensing element 602*a* printed on the top of the flexible component decreases due to a compression by the folding and the resistance value of the bottom sensing element 602*b* printed on the bottom of the flexible component increases due to a tension by the folding. The sensor 208 senses the decreased resistance value of the top sensing element 602*a* and the increased resistance value of the bottom sensing element 602*b*, and accordingly, he processor 210 determines an occurrence of an outward folding 620 in the flexible device 200.

Figure 7A:
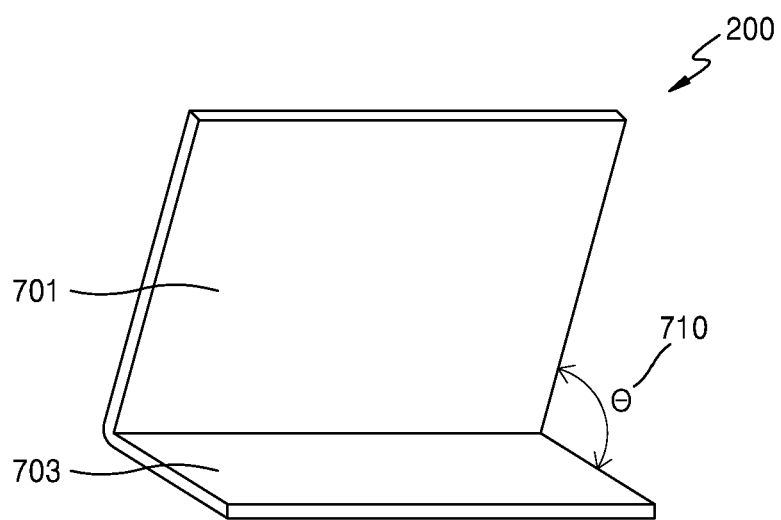
FIG. 7A illustrates an exemplary action of the flexible device based on a location and an angle of the folding, according to an embodiment of the disclosure.

FIG. 7A illustrates an exemplary action of the flexible device based on a location and an angle of the folding, according to an embodiment of the disclosure.

Referring to FIG. 7A, the sensor 208 senses a folding performed on a display 206 of the flexible device 200 and the display 206 may be divided into a first screen 701 and a second screen 703 on an axis of the folding. A gravity sensor included in the flexible device 200 detects that the second screen is facing toward the ground sensed, the processor 210 may determine that the user intends to use the first screen 701 and control to deactivate the portion of the second screen of the display 206 to save a battery of the flexible device 200.

While a user is watching content displayed on the first screen 701 of the display 206, the user may control the folding angle 710 to have a better visual. In an embodiment, the processor 210 may associate the folding angle 710 with setting parameters such as brightness of the first screen 701 of the display 206. For example, if the folding angle 710 becomes lower, the processor 210 may control to have high brightness in the first screen 701 of the display 206.

Figure 7B:
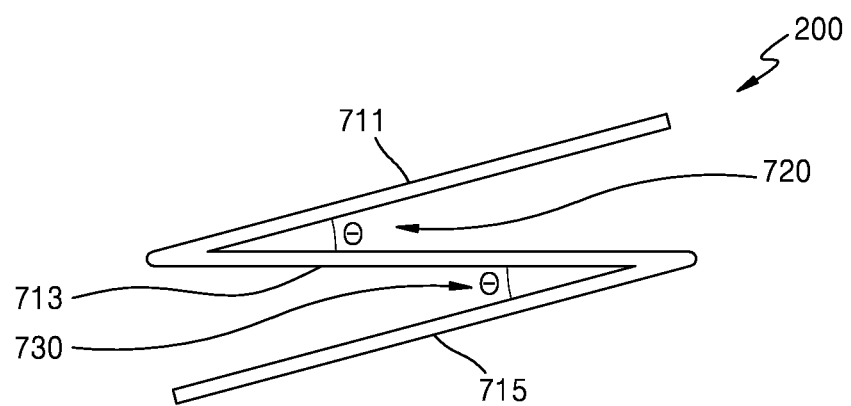
FIG. 7B illustrates another exemplary action of the flexible device based on a location and an angle of the folding, according to an embodiment of the disclosure.

FIG. 7B illustrates another exemplary action of the flexible device based on a location and an angle of the folding, according to an embodiment of the disclosure.

Referring to FIG. 7B, the user of the flexible device 200 ceased to watch content with the flexible device 200 and is folding the flexible device 200. In an embodiment, the processor 210 may detect the folding at two locations with two sensed angles of the folding 720 and 730. Since the processor 210 determines that the two angles of the folding 720 and 730 are lower than a predetermined angle value, the processor 210 may detect the user's intent of stop using the flexible device 200 and the processor 210 may deactivate a second screen 713 which may be unseen by the user due to the folding and may activate a first screen 711 or a third screen 715 which may be seen by the user after the folding.

Figure 8:
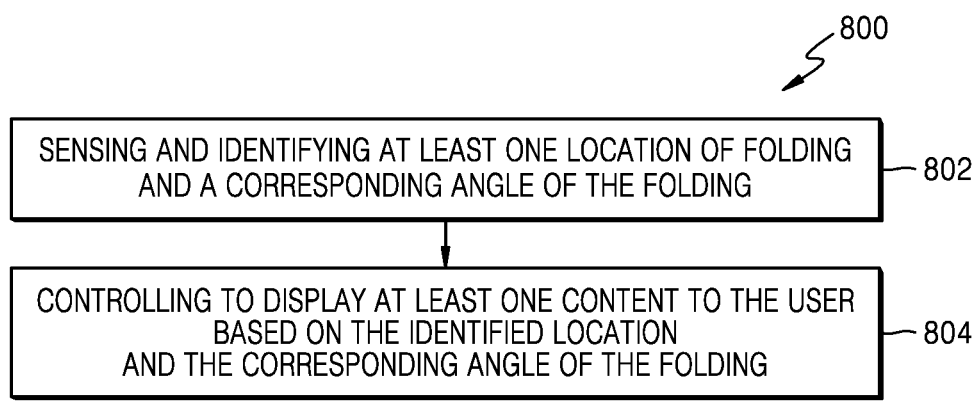
FIG. 8 illustrates a flow diagram of managing a folding of the flexible electronic device, according to an embodiment of the disclosure.

FIG. 8 illustrates a flow diagram of managing a folding of the flexible electronic device, according to an embodiment of the disclosure.

At step 802, the method includes sensing, by the sensor 208, at least one location of a folding and a corresponding angle of the folding in the display 206 of the flexible device 200. The sensor 208 includes at least one bend sensor 302 including at least two sensing elements with an asymmetric configuration. The sensor 208 senses a change of resistance value of the at least two sensing elements included in the at least one bend sensor 302, where the sensed change of the resistance value of the at least two sensing elements corresponds to the at least one location of the folding and the angle of the folding on the flexible device 200. In an embodiment, the sensed change of the resistance value of the at least two sensing elements may be unique for each location of the folding due to the asymmetric configuration of the at least two sensing elements. Thus, the sensor 208 may be able to identify multiple locations of the folding on the flexible device 200.

At step 804, the method includes controlling, by the processor 210, the display 206 to display the at least one content to the user based on the identified location of the folding and the corresponding angle of the folding. The various actions in method 800 may be performed in the order presented, in a different order or simultaneously. Further, in some embodiments, some operations listed in FIG. 8 may be omitted.

Figure 9:
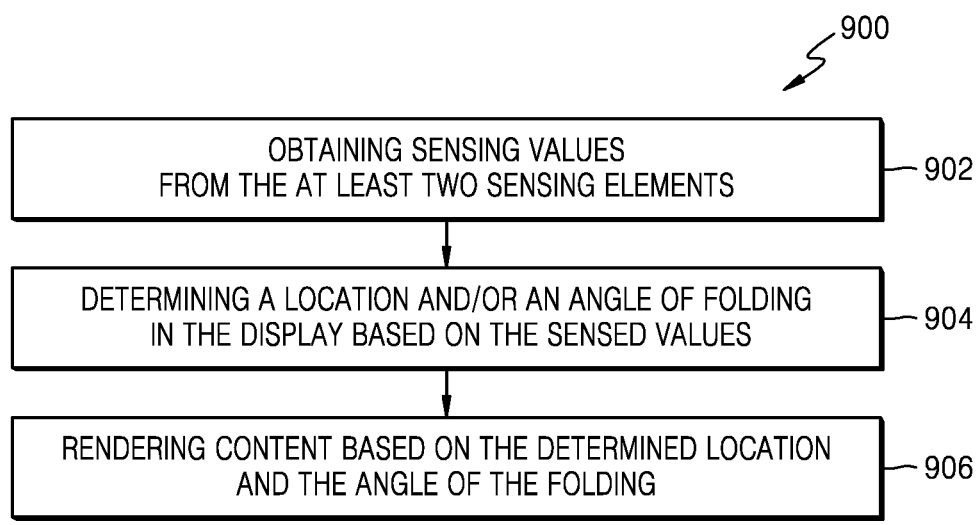
FIG. 9 illustrates a flow diagram illustrating a method of detecting a location and an angle of the folding in the flexible device, according to an embodiment of the disclosure.

FIG. 9 illustrates a flow diagram illustrating a method of detecting a location and an angle of the folding in the flexible device, according to an embodiment of the disclosure.

The sensor 208 may include at least two sensing elements each of which is arranged asymmetrically each other along at least one side of the display 206. At step 902, the sensor 208 may obtain sensing values from the at least two sensing elements.

At step 904, the processor 210 may determine a location and/or an angle of folding in the display 206 based on the sensed values. Due to the asymmetric configuration of the two sensing elements, the resistance values of each of the two sensing elements may differ along one side of the display 206. Likewise, the resistance values of each of the two sensing elements may differ along another side of the display 206. In an embodiment, the processor 210 may detect a folding (or bending) of the flexible device 200 based on a change of the resistance value at a certain location along an axis of the folding.

At step 906, the processor 210 may control the display 206 to render content based on the determined location and the angle of the folding. The processor 210 may also determine an action corresponding to the determined location and/or the angle of the folding in an embodiment of the disclosure. In an embodiment, the action may include activating and/or deactivating certain portions of the display 206 which may be divided by the folding. In another embodiment, the processor 210 may perform an action of rendering first content on the left side screen of the folding axis among the display 206 and rendering second content on the right side screen of the folding axis among the display 206 where the first content is different from the second content.

Embodiments herein provide a method of detecting the location of the folding/bending accurately as compared to a method using an array of conventional bend sensors.

The embodiments disclosed herein can be implemented through at least one software program running on at least one hardware device and performing network management functions to control the elements. The elements shown in FIGS. 1 through 9 can be at least one of a hardware device, or a combination of hardware device and software module.

The embodiments disclosed herein describe methods and systems for managing a flexible electronic device. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the various embodiments of this disclosure may be implemented on different hardware devices, e.g. using a plurality of CPUs.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

Although the present disclosure has been described with various embodiments, various changes and modifications may be suggested to one skilled in the art. It is intended that the present disclosure encompass such changes and modifications as fall within the scope of the appended claims.

What is claimed is:

1. A foldable apparatus, the foldable apparatus comprising:
   a foldable display foldable at multiple locations along a display surface;
   at least one bend sensor coupled to the foldable display comprising at least two bendable sensing elements each of the at least two bendable sensing elements is arranged asymmetrically with respect to each other along the foldable display, the at least two sensing elements positioned along a top and bottom of the foldable display; and
   a processor configured to:
      determine at least one of a location and an angle of folding of the foldable display based on sensed values detected from the at least two bendable sensing elements, and
      render content on the foldable display based on the location and the angle of the folding.

2. The foldable apparatus of claim 1, wherein the at least two bendable sensing elements are triangular-shaped with non-uniform width along the foldable display.

3. The foldable apparatus of claim 1, wherein the at least two bendable sensing elements are trapezoidal-shaped with non-uniform width along the foldable display.

4. The foldable apparatus of claim 1, wherein the at least two bendable sensing elements are resistive material or capacitive material.

5. The foldable apparatus of claim 1, wherein the sensed values are resistance values and the resistance values of the at least two bendable sensing elements differ in a first direction of the foldable display.

6. The foldable apparatus of claim 5, wherein the resistance values of the at least two bendable sensing elements differ in a second direction of the foldable display.

7. The foldable apparatus of claim 6, wherein the processor is further configured to obtain the location and the angle of folding of the foldable display based on resistance values of the at least two bendable sensing elements in the first direction and the second direction of the foldable display.

8. The foldable apparatus of claim 6, wherein the processor is further configured to obtain the angle of the folding based on changes of the resistance values of one of the at least two bendable sensing elements along an axis of the folding.

9. The foldable apparatus of claim 6, wherein the processor is further configured to obtain the location of the folding based on changes of the resistance values of one of the at least two bendable sensing elements.

10. The foldable apparatus of claim 6, wherein the processor is further configured to obtain an occurrence of the folding of the foldable display based on changes of resistance values in the first direction of the foldable display.

11. The foldable apparatus of claim 10, wherein the processor is further configured to obtain the angle of the folding based on changes of the resistance values in the second direction of the foldable display.

12. The foldable apparatus of claim 1, wherein the processor is further configured to render first content at a left side of the location of the folding and render second content at a right side of the location of the folding.

13. The foldable apparatus of claim 1, wherein each of the at least two bendable sensing elements comprises a top sensor in a first layer of the at least two bendable sensing elements and a bottom sensor in a second layer of the at least two bendable sensing elements.

14. The foldable apparatus of claim 13, wherein the processor is further configured to:

obtain a resistance value of the top sensor in the first layer and a resistance value of the bottom sensor in the second layer at a folded location, and obtain the angle of the folding based on the resistance value of the top sensor in the first layer and the resistance value of the bottom sensor in the second layer.

15. The foldable apparatus of claim 1, wherein the sensed values are capacitance values and the capacitance values of the at least two bendable sensing elements differ in a first direction of the foldable display and the capacitance values of the at least two bendable sensing elements differ in a second direction of the foldable display.

16. A method of detecting sensing values in a foldable device, the method comprising:

detecting the sensing values from a bend sensor comprising at least two bendable sensing elements each of at least two bendable sensing elements is arranged asymmetrically with respect to each other along a foldable display, wherein the foldable display is foldable at multiple locations along a display surface and the at least two sensing elements positioned along a top and bottom of the foldable display;

determining a location and an angle of folding of the foldable display based on the sensing values detected from the at least two bendable sensing elements; and rendering content on the foldable display based on the location and the angle of the folding.

\* \* \* \* \*